United States Patent Office 3,338,962
Patented Aug. 29, 1967

---

3,338,962
BORON-NITROGEN COMPOUNDS AND PROCESS FOR THEIR PRODUCTION
Elmar-Manfred Horn, Kurten, Germany, assignor to Farbenfabriken Bayer Aktiengesellschaft, Leverkusen, Germany, a corporation of Germany
No Drawing. Filed Sept. 2, 1965, Ser. No. 484,724
19 Claims. (Cl. 260—551)

This is a continuation-in-part of U.S. application Ser. No. 451,653, filed April 28, 1965 now abandoned.

This invention is concerned with a new class of heterocyclic, boron- and nitrogen-containing compounds, and with a process for their production.

Reactions of boron compounds with nitriles are known. Thus, according to Chemical Reviews, 31, 1/1942, an unstable complex of the empirical formula $CH_3CN.BH_3$ is obtained from acetonitrile and diborane. There has also been observed—Acta Cryst., 3, 121/1950—a reaction between acetonitrile and boron trifluoride, leading to a complex of the formula $CH_3CN.BF_3$. It is also known (J. Chem. Soc. London, 1960, pp. 2614–2617) to produce B-hydridoborazoles from aliphatic mononitriles and diborane.

It is an object of the present invention to provide a new series of heterocyclic boron- and nitrogen containing compounds. It is a further object of the present invention to provide a new series of useful heterocyclic boron- and nitrogen-containing compounds stable to hydrolysis. It is another object of the present invention to provide a new series of heterocyclic boron- and nitrogen-containing compound which are useful as additives for fuels and lubricants. It is still another object of the present invention to provide the highly economic process for the production of said series of heterocyclic boron- and nitrogen-containing compounds. Still further objects will become apparent as the description proceeds.

According to the present invention, there is provided a new series of boron- and nitrogen-containing compounds of the constitution $$(NH.BR_2.CR')_2$$

and a process for producing such compounds which comprises reacting an alkyl or cycloalkyl borane, preferably at a temperature between about 50 to 200° C., with a mononitrile of the general formula $$R'—CN$$

wherein R' is a substituted or unsubstituted alkyl, cycloalkyl or aryl radical.

R' may, for instance, be mono- or polysubstituted with alkyl, cycloalkyl, aryl, alkoxy or aryloxy groups, and/or with halogen atoms. Preferably triorgano-boranes of the general formula $BR_3$, in which R is an alkyl or cycloalkyl radical, are used.

According to infra-red spectroscopic investigations the new heterocyclic boron- and nitrogen-containing compounds possess the following configuration

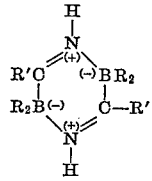

On the basis of this structural formula, the representatives of this new class of compounds are to be designated as 1,4-diaza-2,5-diboracyclohexa-3,6-dienes.

In the production of different derivatives of the diazadiboracyclohexadienes there was observed the occasional appearance of substances which, although having the same analytical composition and the same molecular weight, exhibited differing physical properties, e.g. melting point and boiling point. As was to be expected, the diazadiboracyclohexadienes occur as cis- and trans-isomers. When working up liquid derivatives by distillation, only one of the isomers was always found, whereas the solid derivatives of the diazadiboracyclohexadienes may also be, under certain circumstances, mixtures of the cis-trans-isomers.

When valeronitrile is reacted with boron tripropyl, the process according to the invention can be represented by the following reaction equation:

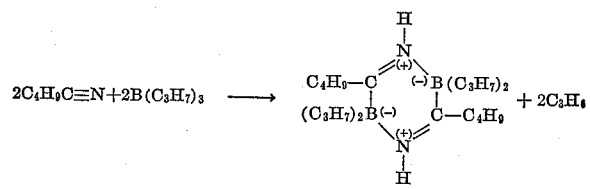

In the reaction of the trialkyl-boranes (or tri cycloalkylboranes) $BR_3$ with the organic mononitriles, one mol of alkene is split off per mol of $BR_3$. The constitution of the alkene split off is determined by the choice of the boron trialkyl; for example, propene and ethene respectively are obtained as by-products when boron tripropyl and boron triethyl respectively are used as boron alkyl.

It is also possible to use as starting materials the tetraalkyl-diboranes, e.g. tetraethyl diborane (the dimeric dialkyl borohydrides). This variant of the process will only be preferred in special cases since tetraalkyl-diboranes are, in general, more difficult to handle and more difficult to prepare than are the corresponding boron trialkyls.

As examples of the triorgano-boranes of the general formula $BR_3$ which are suitable for use in the process of the invention, and which can be easily obtained, e.g. from borohydrides, boron halides and olefins, there may be mentioned boron trialkyls, preferably boron $C_1$–$C_5$ alkyls, such as boron trimethyl, boron triethyl, boron tri-n- and -i-propyl, boron tri-n-butyl and boron triamyl; and boron tricycloalkyls, preferably boron tricyclohexyl.

As organic monocyanides or mononitriles of the general formula $$R'—CN$$

the following groups of cyanides can be used:

(a) alkyl monocyanides with straight chain and branched chain $C_1$–$C_{18}$ alkyl groups, and their substituted derivatives, e.g. having as substituents halogen atoms, preferably F and Cl, or phenyl groups;

(b) cycloalkyl monocyanides, preferably cyclohexyl monocyanides, and their halo-substituted derivatives;

(c) aryl monocyanides, preferably phenyl and naphthyl monocyanides, and their substituted derivatives wherein the substituents are alkyl, cycloalkyl such as cyclohexyl, aryl such as phenyl, alkoxy, aryloxy such as phenyloxy groups, and/or halogen atoms.

Suitable organic monocyanides include acetonitrile, propionitrile, butyronitrile, valeronitrile, capronitrile, the nitriles of octane-, decane-, dodecane-, hexadecane-, and octadecane-carboxylic acids, trifluoroacetonitrile, monochloroacetonitrile, dichloroacetonitrile, trichloroacetonitrile, bromoacetonitrile, 2-chloropropionnitrile, 3-chloropropionitrile, stearic acid nitrile, benzyl cyanide, 4-methyl-benzyl cyanide, 2-chlorobenzyl cyanide, hexahydrobenzoic acid nitrile, 4-chlorohexahydrobenzoic acid nitrile, benzonitrile, 2-chlorobenzonitrile, 3-bromobenzonitrile, 3,5 - dichlorobenzonitrile, p-tolunitrile, 3-methoxy-benzonitrile, 4-phenyl-benzonitrile, 4-cyanodiphenyl ether, 3- chlorobenzonitrile, 4-chlorobenzonitrile, 2,4-dichlorobenzonitrile, 3,4-dichlorobenzonitrile, 2-bromobenzonitrile, 2-chloro-4-methyl-benzonitrile, 4-cyclohexylbenzonitrile, 2-chloro-4-cyclohexylbenzonitrile, 1-naphthonitrile, 2-naphthonitrile, 4 - phenyl-1-cyanonaphthalene, 4-methoxy-1-cyanonaphthalene, 4-ethoxy-2-cyanonaphthalene, 2-chloro - 1-cyanonaphthalene, 4-phenoxy-1-cyanonaphthalene, 2 - bromo - 1 - cyanonaphthalene, 1-chloro-2-cyanonaphthalene.

The process according to the invention is preferably carried out at temperatures substantially between about 50 and 200° C., especially between about 120 and 170° C. Low reaction temperatures permit working without pressure, but it is also possible to work under pressure. This may be of advantage, for example, when low boiling nitriles are to be reacted. It is not necessary to make use of diluents, but solvents or dispersing agents which are inert with respect to the reaction components can be used, for example, higher boiling paraffins and paraffin mixtures, e.g. mineral oils, and aromatic hydrocarbons, e.g. isopropyl-benzene and 1,2,4-trimethyl-benzene.

When the mononitrile is reacted with a trialkyl borane the reaction components are preferably reacted in the molar ratio of about 1:1, when a tetralkyl diborane is used the mol ratio of the reactants is about 1 borane: 2 nitrile. However, other reaction component ratios can also be used.

The new 1,4-diaza-2,5-dibora-cyclohexa-3,6-dienes produced according to the invention are stable to hydrolysis and may be used as additives for fuels and lubricants, in the same way as boron-nitrogen compounds generally. In particular the instant compounds act as antioxidants in lubricants and such compounds improve the combustion properties of fuels such as lead-containing gasoline fuels. Because of the significant stability to hydrolysis the instant compounds are superior to the previously known boron-nitrogen compounds for such purpose.

The following examples are given for the purpose of illustrating, while not limiting, the present invention:

*Example 1*

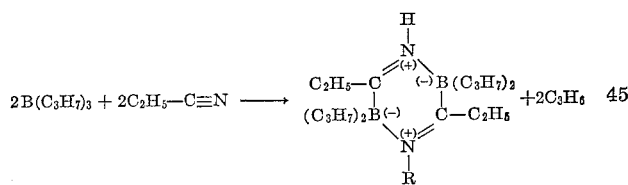

280 grams (2 mols) boron tripropyl are placed in a round-bottomed flask provided with an immersion thermometer and reflux condenser, to which a gas trap and a gas meter are connected, and 110 grams (2 mols) propionitrile are added. This reaction mixture is then heated to reflux. After a short time, the color of the contents of the flask becomes pale yellow. The reaction mixture is heated until about 2 mols gas (according to IR and mass spectrometric investigations: pure propylene) have been split off. The residue in the flask is then fractionated in a vacuum and there are obtained 222 grams 2,2,5,5-tetrapropyl - 3,6 - diethyl-1,4-diaza-2,5-diboracyclohexa-3,6-diene, identified by IR spectrum, corresponding to a yield of 73% of the theoretical; B.P. 100–101° C./1 mm. Hg, $n_D^{20}$ =1.4668.

Molecular weight.—theoretical: 306. Found: 308 (cryoscopic in dioxan); 296 (cryoscopic in benzene).

The mass spectrometric molecular weight determination gave (presumably by splitting off a propyl group) a value smaller by 43 units than that theoretically to be expected.

*Analysis.*—Theoretical: C, 70.5%; H, 13.1%; N, 9.2%; B, 7.2%. Found: C, 70.15%; H, 13.17%; N, 9.27%; B, 7.4%.

In the same manner there was obtained, from 55 grams (1 mol) propionitrile and 260 grams (1 mol) boron tricyclohexyl, in 38% yield, 2,2,5,5-tetracyclohexyl-3,6-diethyl - 1,4 - diaza-2,5-dibora-cyclohexa-3,6-diene, identified by IR spectrum.

*Example 2*

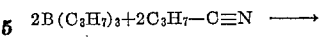
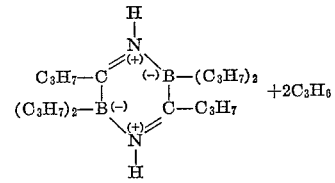

In the apparatus described in the previous example 280 grams (2 mols) boron tripropyl are heated, with stirring, to about 100° C. to 110° C., and 138 grams (2 mols) n-butyronitrile are then added dropwise over a period of about 2 hours. After a short time the reaction mixture becomes pale yellow in color. The sump temperature is slowly increased to 165–175° C. and the sump temperature is then maintained in this region for about 30 minutes. 2 mols gas (according to mass spectrometric investigations: 99.4% propylene) are hereby split off. The contents of the flask are then fractionated in a vacuum and 301 grams 2,2,3,5,5,6-hexapropyl-1,4-diaza-2,5-dibora-cyclohexa-3,6-diene are obtained, identified by IR spectrum.

Yield: 91.5%; B.P. 103–105° C./1 mm. Hg; $n_D^{20}$= 1.4698.

*Analysis.*—Theroetical: C, 71.86%; H, 13.17%; N, 8.40%; B, 6.47. Found: C, 71.80%, 71.83%; H, 13.24%, 13.29%; N, 8.8%; B, 6.49%, 6.57%.

Molecular weight.—Theoretical: 334. Found: 335 (cryoscopic in dioxan).

The mass spectrometric molecular weight determination gave—presumably by splitting off a propyl group—a value lower by 43 units than that theoretically to be expected.

*Example 3*

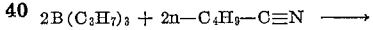
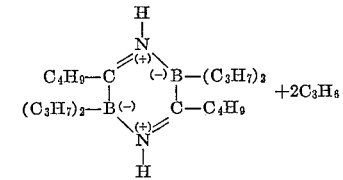

In the same manner as described in Examples 1 and 2 a mixture of 308 grams (2.2 mols) boron tripropyl and 166 grams (2 mols) valeronitrile is heated for about 20 minutes at a temperature of 170–180° C. The color of the flask contents changes to intense yellow and 2 mols of gas (according to mass spectrometric investigations: 98.7% propylene) are split off. After fractionation in a vacuum, there are obtained 132 grams corresponding to a yield of 36.5% 2,2,5,5-tetrapropyl-3,6-dibutyl-1,4-diaza-2,5-dibora-cyclohexa-3,6-diene, identified by its IR spectrum. B.P. 128–130° C./1 mm. Hg; $n_D^{20}$=1.4704.

In the corresponding reaction of 166 grams (2 mols) valeronitrile with 196 grams (2 mols) boron triethyl, there was obtained, in 34% yield, 2,2,5,5-tetraethyl-3,6-dibutyl-1,4-diaza-2,5-dibora-cyclohexa - 3,6 - diene, identified by the IR spectrum.

*Example 4*

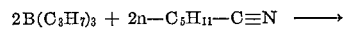
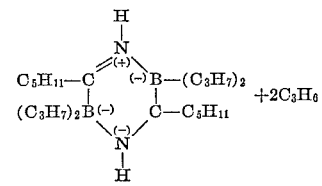

In a manner analogous to that of Examples 1 to 3 there is obtained from 140 grams (1 mol) boron tripropyl and 97 grams (1 mol) capronitrile, with the splitting off of one mol propylene (according to mass spectrometric investigations: 97.8%), a yellow-orange colored reaction product from which, by fractionation in a vacuum, there is obtained, in 47.4% yield, 2,2,5,5-tetrapropyl-3,6-diamyl-1,4-diaza-2,5-dibora - cyclohexa-3,6-diene, identified by the IR spectrum.

B.P. 133–134° C./1 Hg; $n_D^{20}$=1.4692.

*Analysis.*—Theoretical: C, 73.85%; H, 13.33%; B, 5.54%. Found: C, 73.39%, 73.49%; H, 13.32%, 13.44%; B, 5.51%, 5.53%.

The mass spectrometric molecular weight determination gave—presumably by splitting off of a propyl group—a value 43 units less than that theoretically to be expected.

Example 5

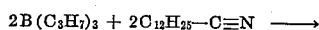

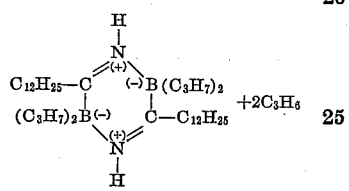

In the apparatus described in Example 1, 390 grams dodecyl nitrile are heated to about 100° C., 308 grams (2.2 mols) boron tripropyl are then added dropwise, and this reaction mixture is heated for a short time at a temperature of 190–200° C. while stirring. The color of the mixture changes to pale yellow, and 2 moles of gas (according to mass spectrometric investigations: 99.4% propylene) are split off. After cooling the flask contents, volatile components are removed in a vacuum. The residue is cooled to 0 to +5° C., when 2,2,5,5-tetrapropyl-3,6-didodecyl-1,4-diaza - 2,5 - dibora-cyclohexa-3,6-diene, formed in a yield of 93.4% and identified by the IR spectrum, crystallizes out. The crystals are washed with cooled hexane and subsequently dried in a vacuum.

*Analysis.*—Theoretical: C, 77.81%; H, 13.65%; N, 4.78%; B, 3.69%. Found: C, 77.31%, 77.32%; H, 13.67%, 13.66%; N, 4.65%, 4.73%; B 3.7%, 3.8%.

Molecular weight.—Theoretical: 586. Found: 582 (cryoscopic in dioxan).

Example 6

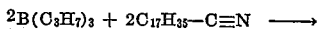

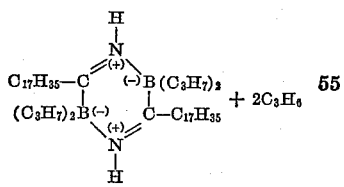

265 grams (1 mol) stearonitrile are melted and heated to about 100° C.; 154 grams (1.1 mols) boron tripropyl are then added dropwise. The reaction mixture is heated at a temperature of about 175–185° C. for about one hour, whereby about one mol of gas (according to mass spectrometric investigations: 99.5% propylene) is split off. After cooling the mixture volatile components are removed in a vacuum, and 2,2,5,5,-tetrapropyl-3,6-distearyl-1,4-diaza-2,5-dibora-cyclohexa-3,6-diene, formed in practically quantitative yield and identified by IR spectrum, is subsequently recrystallized from hexane. M.P. 57–58° C.

*Analysis.*—Theoretical: C, 79.34%; H, 13.77%; N, B, 2.97%. Found: C, 79.28%; H, 14.06%; N, 4.10%; B, 3.1%.

Molecular weight.—Theoretical: 7.26. Found. 710 (osmotic in dioxan).

Example 7

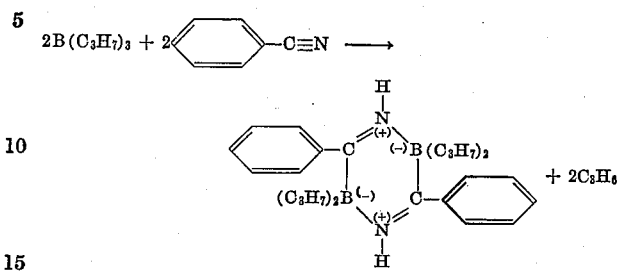

In the apparatus described in Example 1, 308 grams (2.2 mols) boron tripropyl are heated to about 100–110° C. and 206 grams (2 mols) benzonitrile are added dropwise over a period of about 10 minutes. The contents of the flask, the color of which has by now become dark yellow, are then heated at about 200° C. for about one hour; 2 mols gas (according to mass spectrometric investigations: 97.7% propylene) are hereby split off. Upon cooling to room temperature, the flask contents solidify. Volatile components are then removed in an oil pump vacuum at about 60° C. 2,2,5,5-tetrapropyl-3,6-diphenyl-1,4-diaza-2,5-dibora-cyclohexa-3,6-diene, formed in practically quantitative yield and identified by IR spectrum, can be recrystalized from methanol. M.P. 102° C.

*Analysis.*—Theoretical: C, 77.61%; H, 9.65%; N, 69.6%; B, 5.37%. Found: C, 77.58%, 77.80%; H, 10.10%, 10.17%; N, 7.13%, 7.21%; B, 5.5%.

Molecular weight.—Theoretical: 402. Found: 401; 405 (cryoscopic in dioxan).

The mass spectrometric molecular weight determination gave a value lower by 42 units than that theoretically to be expected.

Example 8

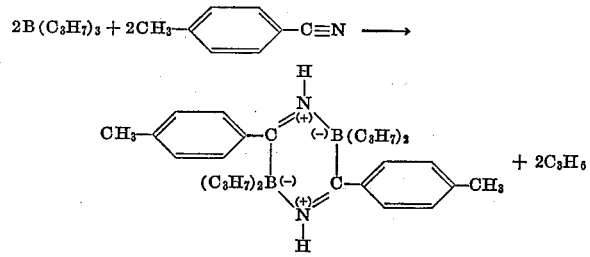

133 grams (1.13 mols) p-tolunitrile are heated to 130° C. in the apparatus described in Example 1, and 178 grams (1.27 mols) boron tripropyl are then added dropwise over a period of about 30 minutes. The reaction mixture is subsequently heated at about 170° C. for about one hour, whereby about 1.2 mols of gas (according to mass spectrometric investigations: 98.8% propylene) are split off. Upon cooling the product to room temperature, white 2,2,5,5-tetrapropyl-3,6-(p-tolyl)-1,4-diaza-2,5-dibora-cyclohexa-3,6-diene, which is formed in a practically quantitative yield and identified by the IR spectrum, crystallizes out; it can be recrystallized from hexane. M.P. 138–139° C.

*Analysis.*—Theoretical: C, 78.14%; H, 10.23%; N, 6.51%, 5.02%. Found: C, 78.05%, 78.17%; H, 10.46%, 10.48%; N, 6.75%, 6.78%; B, 5.1%.

The mass spectrometric molecular weight determination gave—presumably by splitting off a propyl group—a value (387) 43 units less than that theoretically to be expected (430).

Example 9

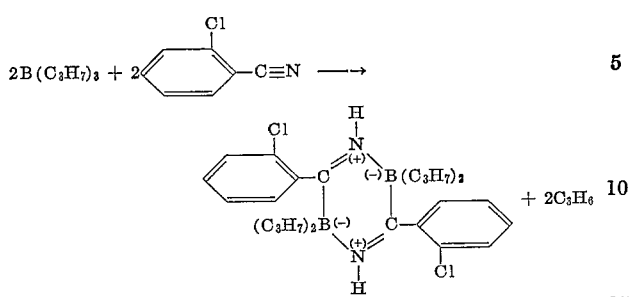

137.5 grams (1 mol) o-chlorobenzonitrile and 154 grams (1.1 mols) boron tripropyl are heated at about 190° C. for about one hour in the apparatus described in Example 1.

The color of the reaction mixture changes to orange, and about 1 mol of gas (according to mass spectrometric investigations: 96.2% propylene) are split off. Upon cooling to room temperature, the contents of the flask crystallize out in the form of dark yellow crystals. The reaction product is washed with cooled methanol and white 2,2,5,5 - tetrapropyl - 3,6-di-(o-chlorophenyl)-1,4-diaza-2,5-dibora-cyclohexa-3,6-diene, formed in practically quantitative yield and identified by the IR spectrum, is subsequently recrystallized from hexane. M.P. 96–97° C.

*Analysis.*—Theoretical: C, 66.28%; H, 8.07%; Cl, 15.07%; B, 4.58%. Found: C, 66.21%; 66.38%; H, 8.14%, 8.23%; Cl, 15.10%; B, 4.8%.

Molecular weight.—Theoretical: 471. Found: 468, 469 (cryoscopic in dioxan).

The mass spectrometric molecular weight determination gave—probably by splitting off a propyl group—a value (428) 43 units less than that theoretically to be expected. (471).

Example 10

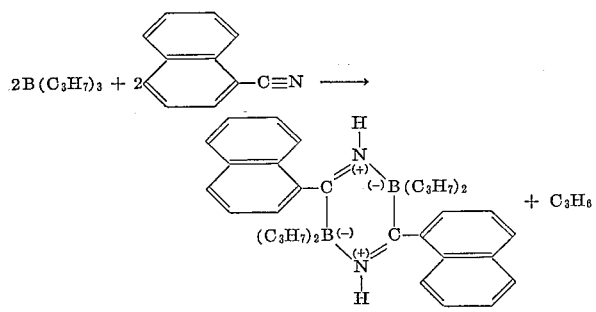

In a manner similar to that described in the previous examples, there are obtained from 306 grams (2 mols) 1-naphthonitrile and 308 grams (2 mols) boron tripropyl, 435 grams (86.2% yield) of white 2,2,5,5-tetrapropyl-3,6 - di-(α-naphthyl)-1,4-diaza-2,5-dibora-cyclohexa-3,6-diene, identified by the IR spectrum. M.P. 106–107° C.

*Analysis.*—Theoretical: C, 81.3%; H, 8.76%; N, 5.57%; B, 4.3%. Found: C, 80.73%; H, 8.69%; N, 5.59%; B, 4.4%.

The mass spectrometric molecular weight determination gave, presumably by splitting off a propyl group, a value (458±2) about 43 units less than the theoretically to be expected (502).

Example 11

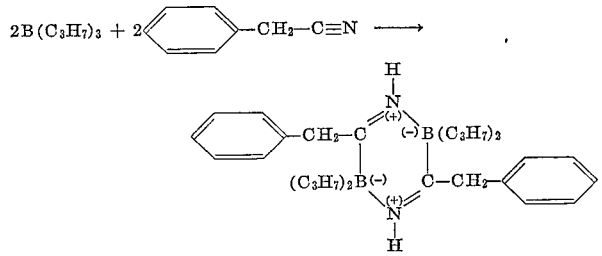

In a manner analogous to that of the previous examples, there is obtained, from 234 grams (2 mols) benzyl cyanide and 308 grams (2.2 mols) boron tripropyl, 2,2,5,5 - tetrapropyl - 3,6-dibenzyl-1,4-diaza-2,5-dibora-cyclohexa-3,6-diene, in the form of white crystals.

The present invention regards a new series of heterocyclic boron- and nitrogen-containing compounds of the general formula $$(NH.BR_2.CR')_2$$

referred to herein as 1,4-diaza-2,5-dibora-cyclohexa-3,6-dienes. In the above mentioned formula R is an alkyl or cycloalkyl radical and R' is a substituted or unsubstituted alkyl, cycloalkyl or aryl radical.

Preferably R is a linear or branched alkyl group, especially a lower alkyl group having from 1 to 5 carbon atoms or a cycloalkyl group, especially a cyclohexyl group. R' may be a linear or branched alkyl group having from 1 to 18 carbon atoms, and such alkyl groups may be substituted by halogen atoms or aryl such as phenyl radicals. The term halogen in this regard comprises fluorine, chlorine, bromine, and iodine, preferably fluorine and chlorine. Furthermore the term R' comprises cycloalkyl groups, such as cyclohexyl, which may be substituted with halogen atoms, whereby the term halogen has the same meaning as given above. Additionally, R' represents aryl groups, preferably phenyl or naphthyl groups which may be substituted by alkyl, cyclohexyl, aryl such as phenyl, alkoxy, aryloxy such as phenyloxy groups and/or halogen atoms. The alkyl, cycloalkyl or aryl groups given for R' thus may be mono- or polysubstituted with the same or different substituents given above. Thus, R' may represent a member selected from the group consisting of alkyl having from 1 to 18 carbon atoms; alkyl having from 1 to 18 carbon atoms which is substituted with a member selected from the group consisting of halogen and phenyl; cyclohexyl; halo-cyclohexyl; phenyl; naphthyl; phenyl which is substituted with a member selected from the group consisting of alkyl, cyclohexyl, phenyl, alkoxy, phenyloxy, halogen and mixtures thereof; and naphthyl which is substituted with a member selected from the group consisting of alkyl, cyclo-hexyl; phenyl, alkoxy, phenyloxy, halogen and mixtures thereof.

More precisely, the 1,4-diazo-2,5-diboracyclohexa-3,6-dienes may be described by the following formula

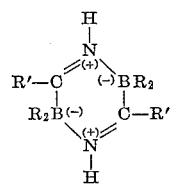

wherein each individual R moiety is a member selected from the group consisting of alkyl having from 1 to 5 carbon atoms, and cyclohexyl, and R' represents a member selected from the group consisting of alkyl having from 1 to 18 carbon atoms, haloalkyl having from 1 to 18 carbon atoms, phenylalkyl having from 1 to 18 carbon atoms in the alkyl chain, cyclohexyl, halocyclohexyl, phenyl, naphthyl, alkyl-phenyl, alkyl-naphthyl, cyclohexyl-phenyl, cyclohexyl-naphthyl, zenyl, phenyl-naphthyl, alkoxy-phenyl, alkoxy-naphthyl, phenyloxyphenyl, phenyloxy-naphthyl, halophenyl and halo-naphthyl.

The present invention comprises further a useful and very economic process for the production of said new series of heterocyclic boron- and nitrogen-containing compounds, wherein alkyl or cycloalkyl boranes are heated with mononitriles of the general formula

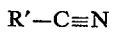

wherein R' is a substituted or unsubstituted alkyl, cycloalkyl or aryl radical, to temperatures of between 50–200° C. Preferably the reaction of said boranes with said mono-nitriles is effected at a temperature of between 120 to 170° C.

As alkyl or cycloalkyl boranes there may be used trialkyl or tricycloalkyl boranes and boranes of the general formula

wherein R is an alkyl or cycloalkyl radical. As alkyl groups preferably linear and branched alkyl groups having from 1 to 5 carbon atoms may be used, such as methyl, ethyl, n-propyl, isopropyl, n-butyl, isobutyl, sec-butyl, tert-butyl, amyl, and the like, and as cycloalkyl groups preferably cyclohexyl groups may be used. As mononitriles there may be used alkylmonocyanides with straight chain or branched $C_1$ to $C_{18}$ alkyl groups, such as methyl, ethyl, n-propyl, isopropyl, n-butyl, isobutyl, sec-butyl, tert-butyl, amyl, hexyl, octyl, decyl, dodecyl, stearyl, octadecyl, and the like, which may be mono- or polysubstituted with halogen atoms, such as chlorine, bromine, iodine and fluorine atoms, and preferably fluorine and chlorine atoms, or phenyl groups; cycloalkyl-monocyanides, preferably cyclohexyl-monocyanides and their mono- or poly-halosubstituted derivatives, such as 4-chlorocyclohexyl-monocyanides; and aryl-monocyanides, preferably phenyl and naphthyl monocyanides and their mono- or poly-substituted derivatives, wherein the substituents may be alkyl such as methyl, ethyl, propyl, butyl, amyl, and the like, i.e., alkyl having 1 to 5 carbon atoms; aryl such as phenyl; alkoxy such as methoxy, ethoxy, propoxy, butoxy, amyloxy, and the like, i.e., alkoxy having 1 to 5 carbon atoms; aryloxy such as phenyloxy; cyclohexyl; and the like, groups, and/or halogen atoms such as chlorine, bromine, iodine, and fluorine. Preferably the reaction between said boranes and said mononitriles is effected in a molar ratio of about 1:1. However, other molar ratios may be used, too.

The reaction may be carried out in the presence of an inert solvent or dispersing agent. As solvents or dispersing agents being inert with respect to the reaction compounds e.g. higher boiling paraffins, paraffin mixtures (mineral oils) and aromatic hydrocarbons (isopropyl benzene and 1,2,4-trimethyl benzene) can be used. However, it is not necessary to use said diluents, solvents or dispersing agents.

Low reaction temperatures permit working without excess pressure. But it is also possible to work under excess pressure, preferably when low boiling nitriles are to be reacted. In this case pressures of 1 to 10 atmospheres are preferred.

What is claimed is:
1. 1,4-diazo-2,5-dibroacyclohexa-3,6-diene of the formula

wherein R is a member selected from the group consisting of alkyl having from 1 to 5 carbon atoms, and cyclohexyl, and R' represents a member selected from the group consisting of alkyl having from 1 to 18 carbon atoms; alkyl having from 1 to 18 carbon atoms which is substituted with a member selected from the group consisting of halogen and phenyl; cyclohexyl; halo-cyclohexyl; phenyl; naphthyl; phenyl which is substituted with a member selected from the group consisting of alkyl having 1 to 5 carbon atoms, cyclohexyl, phenyl, alkoxy having 1 to 5 carbon atoms, phenyloxy, halogen, and mixtures thereof; and naphthyl which is substituted with a member selected from the group consisting of alkyl having 1 to 5 carbon atoms, cyclohexyl, phenyl, alkoxy having 1 to 5 carbon atoms, phenyloxy, halogen, and mixtures thereof.

2. Heterocyclic boron- and nitrogen-containing compound having the formula

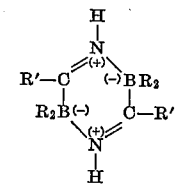

wherein each individual R moiety is a member selected from the group consisting of alkyl having from 1 to 5 carbon atoms, and cyclohexyl, and R' represents a member selected from the group consisting of alkyl having from 1 to 18 carbon atoms, haloalkyl having from 1 to 18 carbon atoms, phenylalkyl having from 1 to 18 carbon atoms in the alkyl chain, cyclohexyl, halocyclohexyl, phenyl, naphthyl, alkyl-phenyl having 1 to 5 carbon atoms in the alkyl moiety alkyl-naphthyl having 1 to 5 carbon atoms in the alkyl moiety, cyclohexyl-phenyl, cyclohexyl-naphthyl, xenyl, phenyl-naphthyl, alkoxy-phenyl having 1 to 5 carbon atoms in the alkyl moiety, alkoxy-naphthyl having 1 to 5 carbon atoms in the alkyl moiety, phenyl-oxyphenyl, phenyloxy-naphthyl, halo-phenyl and halo-naphthyl.

3. The compound having the formula

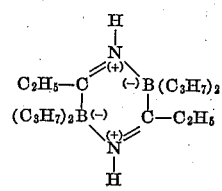

4. The compound having the following formula

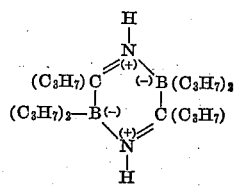

5. The compound having the following formula

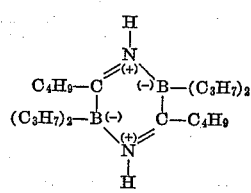

6. The compound having the following formula

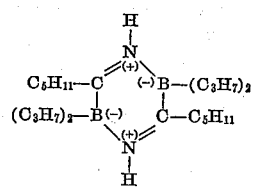

7. The compound having the following formula

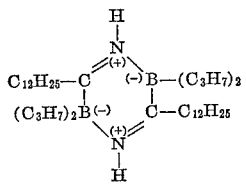

8. The compound having the following formula

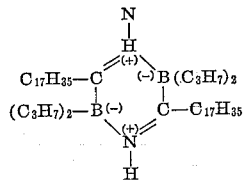

9. The compound having the following formula

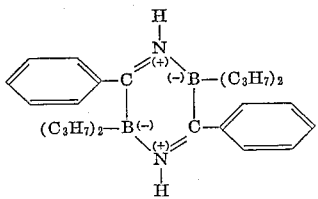

10. The compound having the following formula

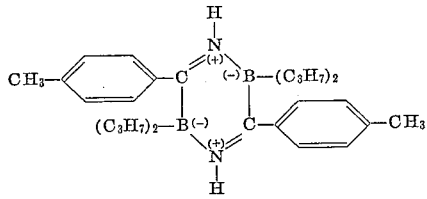

11. The compound having the following formula

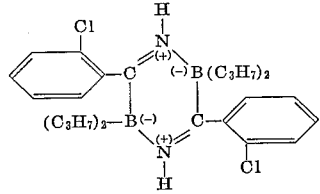

12. The compound having the following formula

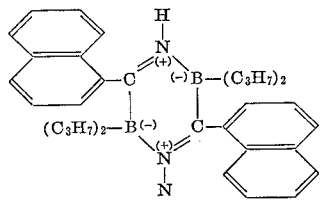

13. The compound having the following formula

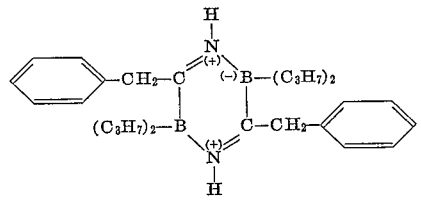

14. Process for the production of 1,4-diazo-2,5-diboracyclohexa-3,6-diene which comprises reacting a member selected from the group consisting of trisubstituted borane which is trisubstituted with a member selected from the group consisting of lower alkyl, cyclohexyl and mixtures thereof, tetralower alkyldiborane and tetracyclohexyl diborane with mononitrile of the formula $$R'—C\equiv N$$

wherein R' is a member selected from the group consisting of alkyl having from 1 to 18 carbon atoms; alkyl having from 1 to 18 carbon atoms which is substituted with a member selected from the group consisting of halogen and phenyl; cyclohexyl; halo-cyclohexyl; phenyl; naphthyl; phenyl which is substituted with a member selected from the group consisting of alkyl having 1 to 5 carbon atoms, cyclohexyl, phenyl, alkoxy having 1 to 5 carbon atoms, phenyloxy, halogen, and mixtures thereof; and naphthyl which is substituted with a member selected from the group consisting of alkyl having 1 to 5 carbon atoms, cyclohexyl, phenyl, alkoxy having 1 to 5 carbon atoms, phenyloxy, halogen, and mixtures thereof, at a temperature substantially between about 50 and 200° C. whereby to form the corresponding 1,4-diaza-2,5-diboracyclohexa-3,6-diene.

15. Process for the production of 1,4-diaza-2,5-diboracyclohexa-3,6-diene of the formula $$(NH.BR_2.CR')_2$$

wherein each individual R moiety is a member selected from the group consisting of alkyl having from 1 to 5 carbon atoms, and cyclohexyl, and R' represents a member selected from the group consisting of alkyl having from 1 to 18 carbon atoms, haloalkyl having from 1 to 18 carbon atoms, phenyl-alkyl having from 1 to 18 carbon atoms in the alkyl chain, cyclohexyl, halocyclohexyl, phenyl, naphthyl, alkyl-phenyl having 1 to 5 carbon atoms in the alkyl moiety, alkyl-naphthyl having 1 to 5 carbon atoms in the alkyl moiety, cyclohexyl-phenyl, cyclohexyl-naphthyl, xenyl, phenyl-naphthyl, alkoxy-phenyl having 1 to 5 carbon atoms in the alkoxy moiety, alkoxy-naphthyl having 1 to 5 carbon atoms in the alkoxy moiety, phenyloxy-phenyl, phenyloxy-naphthyl, halo-phenyl and halo-naphthyl, which consists essentially of reacting a borane selected from the group consisting of a $C_1$ to $C_5$ trialkyl borane, a tricyclohexyl borane and a borane of the formula $$(R_2BH)_2$$

wherein R is the same as defined above, with a mononitrile of the formula $$R'—C\equiv N$$

wherein R' is the same as defined above, at temperatures of between 50 and 200° C. whereby to form the corresponding 1,4-diazo-2,5-diboracyclohexa-3,6-diene.

16. Process according to claim 15, wherein the reaction is carried out at temperatures substantially between about 120 and 170° C.

17. Process according to claim 15, wherein the borane is trialkylborane having 1 to 5 carbon atoms in each alkyl moiety and such trialkylborane and the mononitrile are reacted in a molar ratio of about 1:1.

18. Process according to claim 15, wherein the borane is tetraalkyl diborane having 1 to 5 carbon atoms in each alkyl moiety and such tetraalkyl diborane and the mononitrile are reacted in a molar ratio of about 1:2.

19. Process according to claim 15, wherein the reaction is carried out in the presence of an inert medium selected from the group consisting of higher boiling paraffin, paraffin mixtures and aromatic hydrocarbon.

References Cited

Hesse et al.: Angew. Chem., vol. 75, pp. 791–92 (1963).

WALTER A. MODANCE, *Primary Examiner.*

HARRY I. MOATZ, *Assistant Examiner.*

UNITED STATES PATENT OFFICE
CERTIFICATE OF CORRECTION

Patent No. 3,338,962                      August 29, 1967

Elmar-Manfred Horn

It is hereby certified that error appears in the above numbered patent requiring correction and that the said Letters Patent should read as corrected below.

In the heading to the printed specification, after line 7, insert -- Claims priority, application Germany, May 9, 1964, F 42,839 --; column 3, lines 41 to 49, for that portion of the formula reading $$\underset{R}{|} \quad \text{read} \quad \underset{H}{|}$$

column 4, lines 66 to 75, for that portion of the formula reading $$\underset{H}{\overset{N}{|}} \quad \text{read} \quad \underset{H}{\overset{N}{\|}}$$

column 5, line 73, after "N" insert -- 3.86% --; column 8, line 56, column 9, line 62, column 11, line 68 and column 12, line 50, for "diazo", each occurrence, read -- diaza --; column 8, line 75, for "zenyl" read -- xenyl --; column 9, line 35, for "monocyanides" read -- monocyanide --; column 10, line 26, for "alkyl moiety" read -- alkyl moiety, --; column 11, lines 49 to 59, for the bottom portion of the formula reading $$\underset{N}{\overset{N}{|}} \quad \text{read} \quad \underset{H}{\overset{N}{|}}$$

Signed and sealed this 13th day of August 1968.

(SEAL)
Attest:

EDWARD M. FLETCHER, JR.             EDWARD J. BRENNER
Attesting Officer                   Commissioner of Patents